Sept. 13, 1927.
W. J. DALY
1,642,410
AXLE AND DRIVING WHEEL FOR LOCOMOTIVES
Filed July 7, 1927
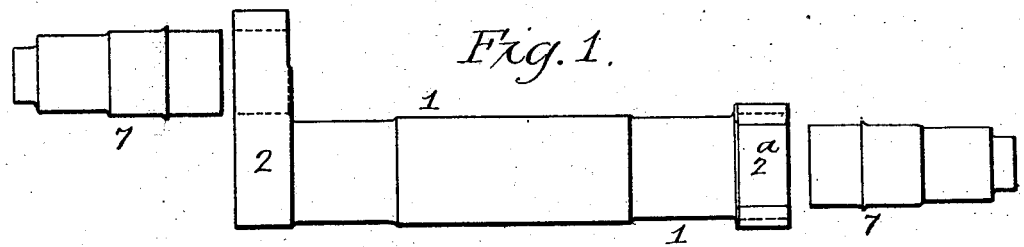
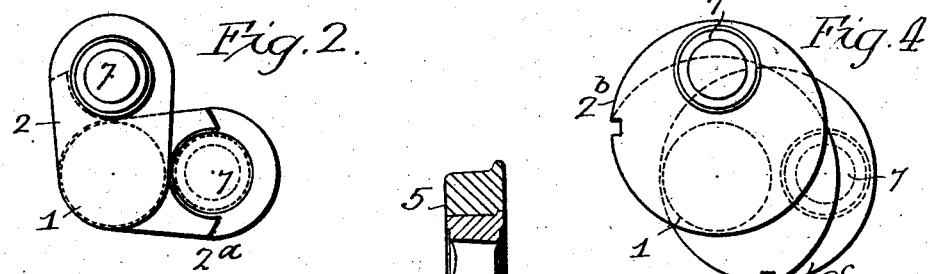 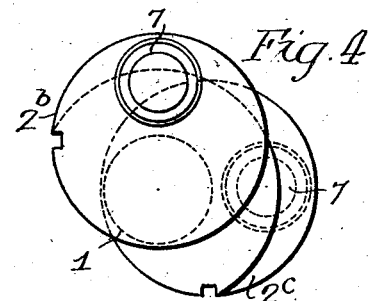
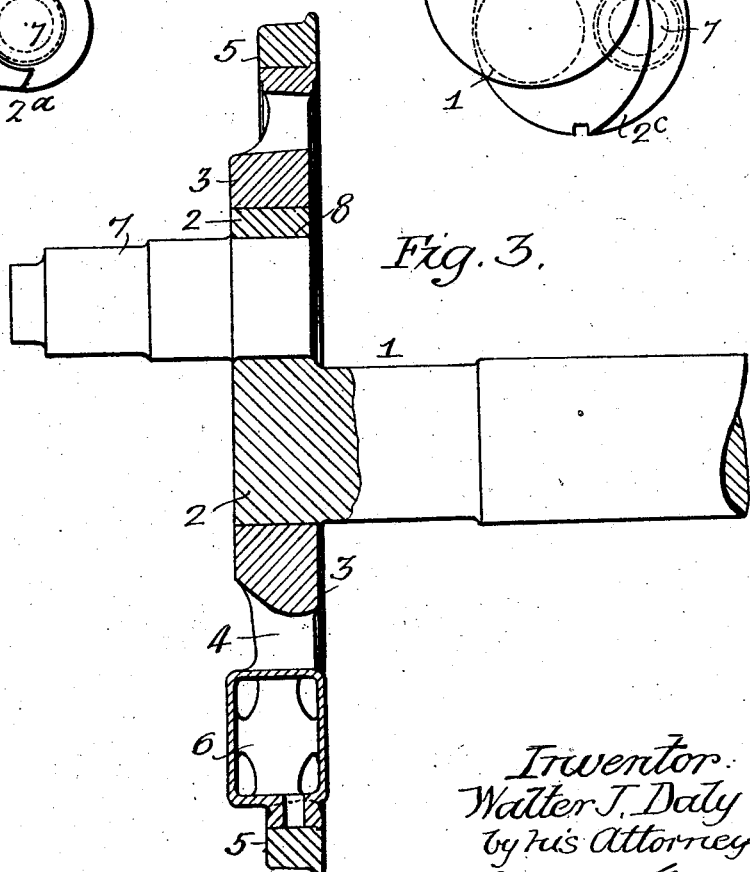
Inventor:
Walter J. Daly
by his Attorneys Patented Sept. 13, 1927.

1,642,410

UNITED STATES PATENT OFFICE.

WALTER J. DALY, OF CONSHOHOCKEN, PENNSYLVANIA.

AXLE AND DRIVING WHEEL FOR LOCOMOTIVES.

Application filed July 7, 1927. Serial No. 204,083.

The object of my invention is to improve the construction of locomotive axles and driving wheels. This object I attain by making a portion of a wheel an integral part of a driving axle.

In the accompanying drawing:

Fig. 1 is a side view of an axle made in accordance with my invention, and showing the driving pins separated therefrom;

Fig. 2 is an end view of the axle shown in Fig. 1;

Fig. 3 is a sectional view through the driving wheel and a portion of the axle; and Fig. 4 is a view illustrating a modification of the invention.

As the power of a locomotive, as well as the stroke, has increased to such an extent that large driving pins and enlarged axles are now necessary, I have been enabled to retain the necessary proportions between the parts by making enlargements on the ends of the axle which fit openings in the wheel and which carry the driving pins.

1 is the axle having enlargements 2—2ª at each side. These enlargements are oblong in shape as shown, and one enlargement in the present instance is at right angles to the other, but the angle may vary without departing from the essential features of the invention. These enlargements are rounded at each end and are slightly tapered, fitting corresponding openings in the body of the wheel centre 3.

The wheel 3 is the ordinary type of driving wheel and has spokes 4, a tire 5, and a counterbalance 6. The wheel is driven onto the enlargements 2—2ª of the axle and is prevented from turning thereon by the shape of said enlargements.

The driving pin 7 is driven into an opening 8 in the enlargement 2 as clearly shown in Fig. 3, so that the driving pin is connected directly to the axle. In some instances the projections may be circular in form, as at 2ᵇ and 2ᶜ, Fig. 4, fitting circular openings in the body of the wheel. In this case a key or other means of fastening the parts may be used to securely attach the wheel to the axle after it has been driven into position.

By making the enlargements 2—2ª an integral part of the axle and driving the pin into an opening in these enlargements, the pin is directly connected to the axle and can be of the proper proportion to provide sufficient strength for the parts, without in any way interfering with the size of the axle.

While the drawing shows a plain driving axle, the invention is applicable to a crank-axle of a three or four cylinder locomotive.

I claim:

1. The combination of a driving axle having an integral enlargement at one end; a driving pin mounted in the enlargement; and a wheel mounted on the enlargement.

2. The combination of a driving axle for locomotives, having integral enlargements at each end; and driving pins mounted in the enlargements.

3. The combination of a driving axle having enlargements at each end, said enlargements being at an angle in respect to each other, and having openings for driving pins; driving pins driven into the openings; and driving wheels mounted on the enlargements.

4. The combination of an axle having enlargements at each end and having openings, one opening arranged at an angle in respect to the other; a driving pin mounted in each enlargement, said enlargements being shaped other than round; and driving wheels having openings corresponding to the shape of the enlargements and driven onto said enlargements.

WALTER J. DALY.